United States Patent
Steele et al.

(10) Patent No.: US 8,776,531 B2
(45) Date of Patent: Jul. 15, 2014

(54) GAS ENGINE DRIVES FOR GASIFICATION PLANTS

(75) Inventors: Raymond Douglas Steele, Houston, TX (US); Anindra Mazumdar, Houston, TX (US); Pradeep S. Thacker, Houston, TX (US); Richard DePuy, Schenectady, NY (US); Gary D. Miller, Houston, TX (US)

(73) Assignee: General Electric Company, Schenectady, NY (US)

( * ) Notice: Subject to any disclaimer, the term of this patent is extended or adjusted under 35 U.S.C. 154(b) by 1286 days.

(21) Appl. No.: 12/613,592

(22) Filed: Nov. 6, 2009

(65) Prior Publication Data

US 2011/0107735 A1 May 12, 2011

(51) Int. Cl.
- *F02C 6/18* (2006.01)
- *F01K 11/04* (2006.01)
- *F01K 23/06* (2006.01)
- *F02C 3/28* (2006.01)

(52) U.S. Cl.
CPC . *F02C 3/28* (2013.01); *Y02E 20/18* (2013.01); *F02C 6/18* (2013.01); *F01K 11/04* (2013.01); *F01K 23/067* (2013.01); *Y02E 20/16* (2013.01)
USPC ............................................. 60/780; 60/781

(58) Field of Classification Search
USPC ................. 60/780, 781, 39.5, 39.52
See application file for complete search history.

(56) References Cited

U.S. PATENT DOCUMENTS

| | | | |
|---|---|---|---|
| 5,664,411 A * | 9/1997 | Shao | 60/776 |
| 6,032,456 A * | 3/2000 | Easom et al. | 60/793 |
| 6,430,915 B1 * | 8/2002 | Wiant et al. | 60/39.12 |
| 2004/0011057 A1 | 1/2004 | Huber | |
| 2004/0123601 A1 | 7/2004 | Fan | |
| 2005/0235650 A1 | 10/2005 | Griffin et al. | |
| 2008/0098654 A1 | 5/2008 | Cherry et al. | |
| 2009/0173081 A1 | 7/2009 | Wallace et al. | |

FOREIGN PATENT DOCUMENTS

| | | |
|---|---|---|
| WO | 2004046523 A2 | 6/2004 |
| WO | 2008099312 A2 | 8/2008 |
| WO | 2009027230 A2 | 3/2009 |

OTHER PUBLICATIONS

International Search Report and Written Opinion issued in connection with WO Application No. PCT/US2010/051617, Feb. 2, 2011.

* cited by examiner

*Primary Examiner* — Phutthiwat Wongwian
*Assistant Examiner* — Vikansha Dwivedi
(74) *Attorney, Agent, or Firm* — Sutherland Asbill & Brennan LLP

(57) ABSTRACT

The present application provides an integrated gasification combined cycle system. The integrated gasification combined cycle system may include a gas turbine engine, a syngas system for producing a syngas for the gas turbine engine and having a compressor therein, and a second gas engine in communication with the syngas system. The second gas engine dives the compressor via the syngas.

14 Claims, 2 Drawing Sheets

GAS ENGINE DRIVES FOR GASIFICATION PLANTS

TECHNICAL FIELD

The present application relates generally to integrated gasification combined cycle power plants and more particularly relates to the use of excess syngas or other fuels to drive gas engines to reduce parasitic loads and hence boost overall power plant output.

BACKGROUND OF THE INVENTION

Carbon dioxide ($CO_2$) produced in power generation facilities is considered to be a green house gas. As such, the carbon dioxide produced in the overall power production process generally is sequestered and then recycled for other purposes. In current integrated gasification combined cycle ("IGCC") technologies, the precombustion capture of carbon dioxide is preferred. Once captured, the carbon dioxide generally may be compressed before transport, disposal, or other use. Specifically, various IGCC designs require the compression of the carbon dioxide before the gas is recycled to, for example, the feed system, the gasifier, or other locations in the overall IGCC process.

The gross power output from an IGCC or other type of power plant is determined by the output of the gas turbine engine(s) operating on a syngas or other fuel. Any parasitical electrical or other type of load in the power plant serves to reduce the net generation output of the power plant. Compression of carbon dioxide, however, generally requires large amounts of auxiliary compression power. This compression is usually provided by electric drives or steam turbines. This type of parasitic load thus results in lower power plant net output and efficiency.

There is thus a desire for an improved power plant and methods of driving compression equipment and other types of plant equipment without being a parasitic load on the IGCC plant as a whole. Such a reduced parasitic load also will increase the net power generation output.

SUMMARY OF THE INVENTION

The present application thus provides an integrated gasification combined cycle system. The integrated gasification combined cycle system may include a gas turbine engine, a syngas system for producing a syngas for the gas turbine engine and having a compressor therein, and a second gas engine in communication with the syngas system. The second gas engine drives the compressor via the syngas.

The present application further provides an integrated gasification combined cycle system. The integrated gasification combined cycle system may include a gas turbine engine, a syngas system for producing a syngas for the gas turbine engine and having a load therein, and a second gas engine in communication with the syngas system. The second gas engine drives the load via the syngas.

The present application further provides for an integrated gasification combined cycle system. The integrated gasification combined cycle system may include a gas turbine engine, a gasifier for producing a syngas for the gas turbine engine, an acid gas removal system in communication with the gasifier, a carbon dioxide recycle compressor in communication with the acid gas removal system and the gasifier, and a second gas engine in communication with the carbon dioxide recycle compressor. The second gas engine drives the carbon dioxide recycle compressor via the syngas.

These and other features and improvements of the present application will become apparent to one of ordinary skill in the art upon review of the following detailed description when taken in conjunction with the several drawings and the appended claims.

DETAILED DESCRIPTION

Figure 1:
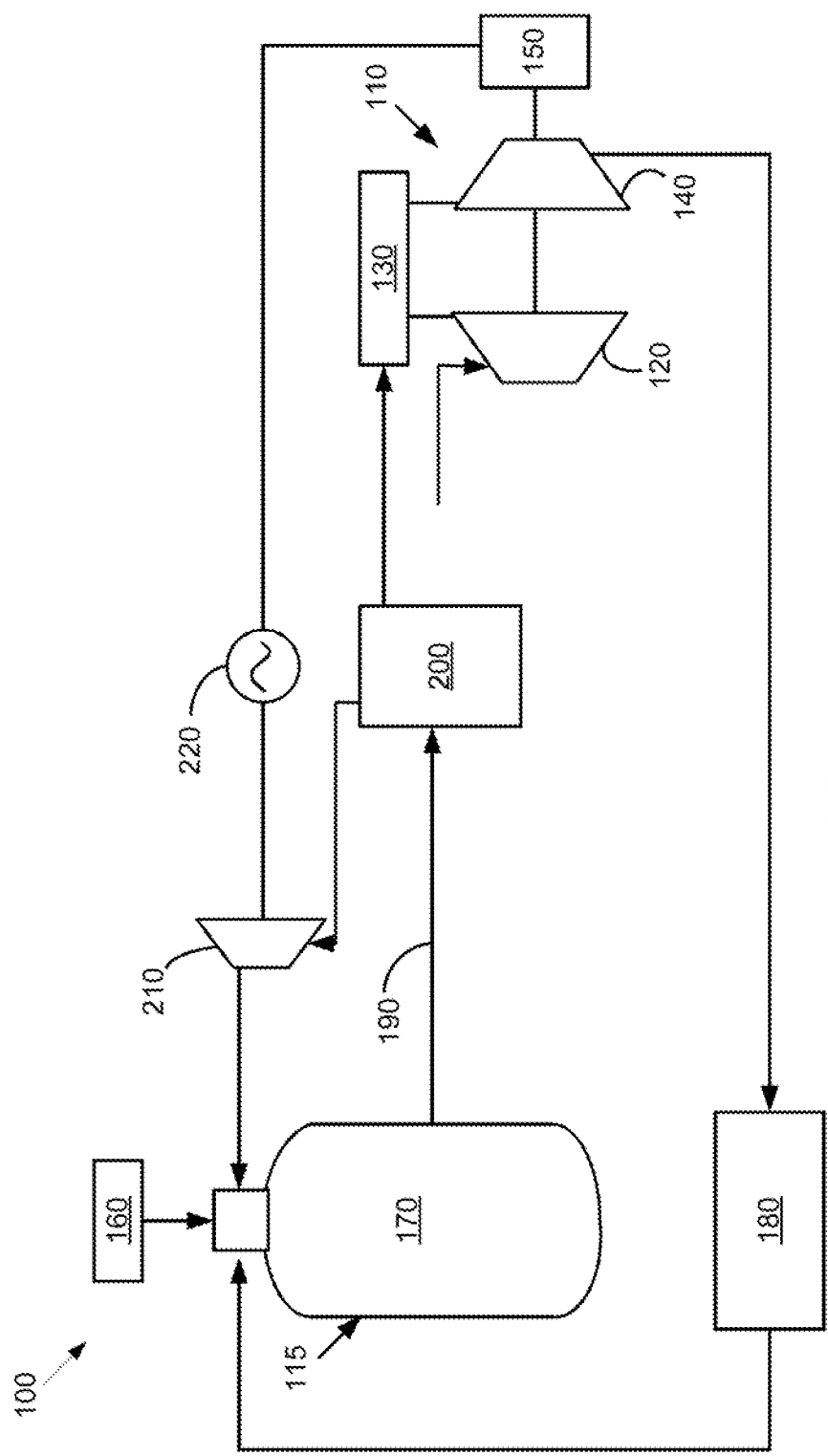
FIG. 1 is a schematic view of portions of an integrated gasification combined cycle power plant.

Referring now to the drawings, in which like numerals refer to like elements throughout the several views, FIG. 1 shows a schematic view of a known integrated gasification combined cycle ("IGCC") power plant 100. Only those elements related to the subject matter described herein are shown for purposes of simplification. The overall IGCC power plant 100 may have many other configurations and may use many other types of equipment.

The IGCC power plant 100 may include one or more gas turbine engines 110. As is known, the gas turbine engine 110 may include a compressor 120 to compress an incoming flow of air. The compressor 120 delivers the compressed flow of air to a combustor 130. The combustor 130 mixes the compressed flow of air with a compressed flow of fuel and ignites the mixture. Although only a single combustor 130 is shown, the gas turbine engine 110 may include any number of combustors 130. The hot combustion gases are in turn delivered to a turbine 140. The hot combustion gases drive the turbine 140 so as to produce mechanical work. The mechanical work produced in the turbine 140 drives the compressor 140 and an external load 150 such as an electrical generator and the like. The gas turbine engine 110 may have many other configurations and may use many other types of equipment. The IGCC power plant 100 may have multiple gas turbine engines 110.

The gas turbine engine 110 may use natural gas, various types of syngas, combinations thereof, and other types of fuels. If used, the syngas may be derived from a syngas production system 115. The syngas production system 115 may produce the syngas from a source of coal 160 according to several known techniques. In this example, the coal may be delivered to a gasifier 170. The gasifier 170 mixes the coal from the coal source 160 with oxygen from an air separation unit 180 or other source to produce a syngas 190 via a partial oxidation process or otherwise. The air separation unit 180 may receive extraction air from the turbine 140 or other source. Other types of gasification techniques and other sources of syngas may be used herein.

The raw syngas 190 from the gasifier 170 then may be sent to an acid gas removal system 200. The acid gas removal system 200 removes carbon dioxide, hydrogen sulfide ($H_2S$), and other gases from the syngas 190. The acid gases may be removed via a catalytic process, a solvent, and other known techniques. The now clean syngas 190 then may be forwarded to the combustor 130 of the gas turbine engine 110 for combustion in the manner described above or otherwise.

The syngas production system 115 also may include a carbon dioxide recycle compressor 210 to compress the carbon dioxide produced by the acid gas removal system 200 or otherwise. As described above, the carbon dioxide is generally required to be compressed before being recycled to the feed stream, the gasifier 170, the air separation unit 180, or other locations in the syngas production system 115 and the overall IGCC power plant 100. In this example, at least a portion of the carbon dioxide may be returned to the gasifier 170.

A number of other steps may be used between the gasifier 170 and the acid gas removal system 200 and in the overall IGCC power plant 100. For example, particulate scrubbing, cooling, hydrolysis, water gas shift, mercury removal, and other steps may be used herein. Likewise, clean syngas heating and moisture addition may take place between the acid gas removal system 200 and the gas turbine engine 110. Many other steps, devices, and processes may be used herein.

The carbon dioxide recycle compressor 210 may be a conventional compressor. The carbon dioxide recycle compressor 210 may be driven in this example by an electrical motor 220. A steam turbine or other types of drive devices also may be used. The electrical motor 220 may be of conventional design. The electrical motor 220 may be considered a parasitic load on the overall IGCC power plant 100 and thus reduces the gross power generation therein. Generally described, other parasitic loads on the IGCC power plant 110 may include the air separation unit 180 and other components thereof.

Figure 2:
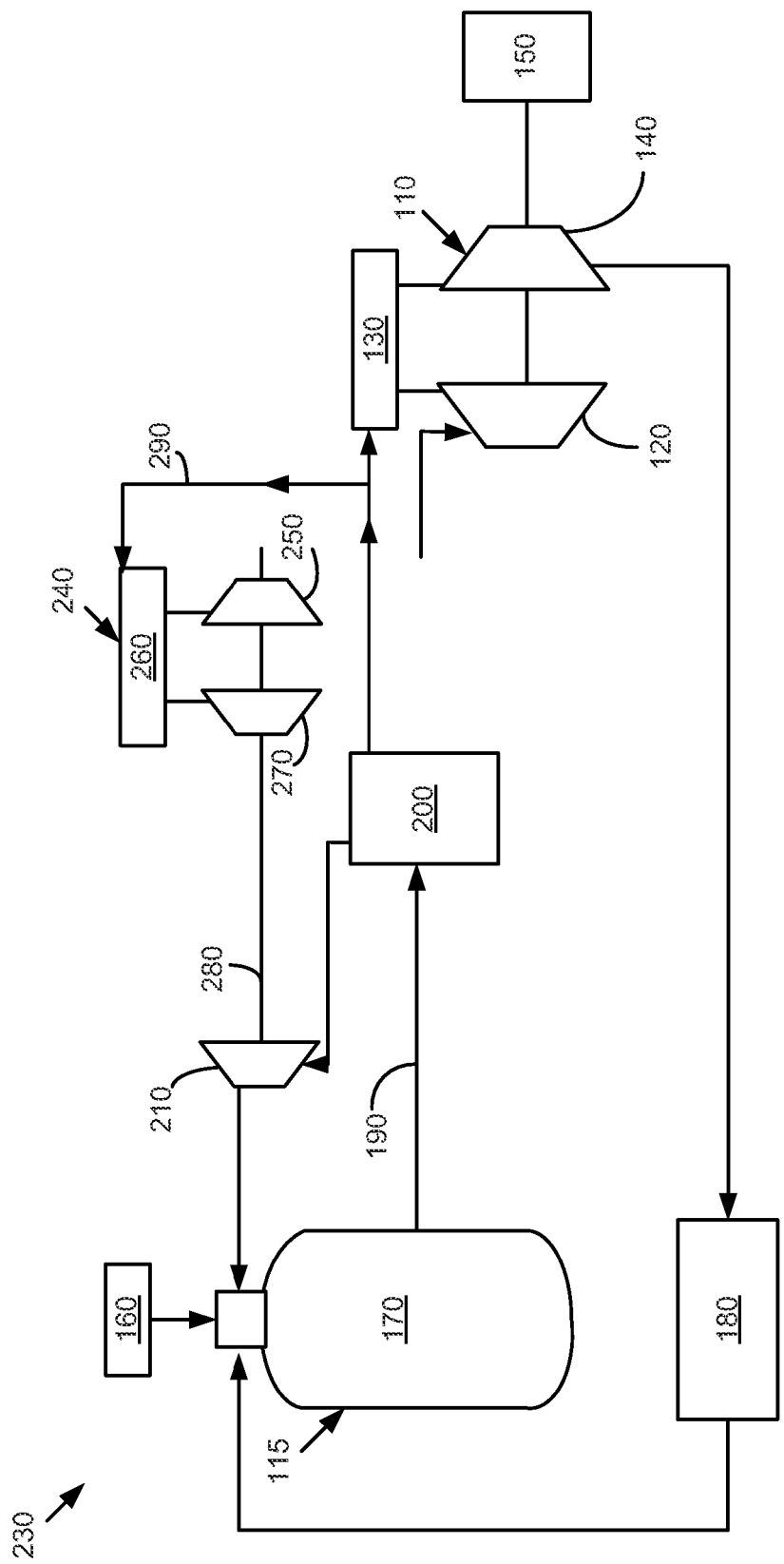
FIG. 2 is a schematic view of portions of an integrated gasification combined cycle power plant with a gas turbine engine driven compressor as is described herein.

FIG. 2 shows an example of an ICGG power plant 230 as is described herein. In this example, the carbon dioxide recycle compressor 210 may be driven by a second gas engine 240 instead of the electrical motor 220. The second gas engine 240 may be any type of gas driven combustion engine including a gas turbine engine, a reciprocating engine or an internal combustion engine, and the like. The second gas engine 240 may be, for example, 6B heavy-duty gas turbine, a Jenbacher reciprocating gas engine, or other types of engines offered by General Electric Company of Schenectady, N.Y. In this example, the second gas engine 240 may include a compressor 250, a combustor 260, and a turbine 270 similar to the gas turbine engine 110 described above. The carbon dioxide recycle compressor 210 thus may be directly driven via a shaft 280 of the second gas engine 240. Alternatively, the second gas engine 240 may drive any other type of load such as an electrical generator and the like and/or the electrical motor 220 as is described above.

The combustor 260 of the second gas engine 240 may be in communication with the syngas 190 from the gasifier 170 via a diversion line 290 or from any other source. The capacity of the gasifier 170 may be increased over typical gasifier designs so as to produce an excess amount of the syngas 190 without making substantial changes to the overall ICGG power plant 230.

Although the second gas engine 240 is shown as driving the carbon dioxide recycle compressor 230, the second gas engine 240 also could drive the air separation unit 180 or any other component of the syngas production system 115 or the overall ICGG power plant 230 so as to reduce the parasitic electrical load on the ICGG power plant 230 and, hence, increase the overall generated power. Likewise, the second gas engine 240 may directly increase the overall net output of the ICGG power plant 230. Multiple gas engines 240 may be used herein.

Although there are costs involved with the use of the second gas engine 240 in terms of equipment and possibly in additional emissions, these costs should be more than offset by the additional power generation available due to the reduction in the parasitic load. Specifically, the power produced by the second gas engine 240 may be provided at a much lower cost than that generally produced by the ICGG power plant 230 as a whole.

It should be apparent that the foregoing relates only to certain embodiments of the present application and that numerous changes and modifications may be made herein by one of ordinary skill in the art without departing from the general spirit and scope of the invention as defined by the following claims and the equivalents thereof.

We claim:

1. An integrated gasification combined cycle system, comprising:
    a gas turbine engine;
    a syngas system in communication with the gas turbine engine, the syngas system comprising:
        a gasifier for producing a raw syngas;
        an acid gas removal system in communication with the gasifier and the gas turbine engine, wherein the acid gas removal system receives the raw syngas from the gasifier and removes at least a portion of carbon dioxide from the raw syngas so as to produce a clean syngas; and
        a carbon dioxide recycle compressor in communication with the gasifier and the acid gas removal system, wherein the carbon dioxide recycle compressor receives the removed carbon dioxide from the acid gas removal system; and
    a second gas engine in communication with the syngas system, wherein the second gas engine receives a fuel comprising a portion of the clean syngas and drives the carbon dioxide recycle compressor via combustion of the fuel.

2. The integrated gasification combined cycle system of claim 1, wherein the carbon dioxide recycle compressor directs at least a portion of a compressed carbon dioxide to the gasifier.

3. The integrated gasification combined cycle system of claim 1, wherein the second gas engine comprises a gas turbine engine.

4. The integrated gasification combined cycle system of claim 1, wherein the second gas engine comprises a reciprocating gas engine.

5. The integrated gasification combined cycle system of claim 1, wherein the second gas engine comprises a turbine compressor, a combustor, a turbine, and a shaft, and wherein the carbon dioxide recycle compressor is driven by the shaft.

6. The integrated gasification combined cycle system of claim 1, wherein the syngas system further comprises an air separation unit in communication with the gasifier and the gas turbine engine, and wherein the air separation unit receives an extraction air from the gas turbine engine and directs the extraction air to the gasifier.

7. An integrated gasification combined cycle system, comprising:
    a gas turbine engine;
    a syngas system in communication with the gas turbine engine, the syngas system comprising:
        a gasifier for producing a raw syngas;
        an acid gas removal system in communication with the gasifier and the gas turbine engine, wherein the acid gas removal system receives the raw syngas from the gasifier and removes at least a portion of carbon dioxide from the raw syngas so as to produce a clean syngas; and
        a carbon dioxide recycle compressor in communication with the gasifier and the acid gas removal system, wherein the carbon dioxide recycle compressor receives the removed carbon dioxide from the acid gas removal system and directs at least a portion of a compressed carbon dioxide to the gasifier; and a second gas engine in communication with the syngas system, wherein the second gas engine receives a fuel comprising a portion of the clean syngas and drives the carbon dioxide recycle compressor via combustion of the fuel.

8. The integrated gasification combined cycle system of claim 7, wherein the carbon dioxide recycle compressor directs a second portion of the compressed carbon dioxide to a feed stream of the syngas system.

9. The integrated gasification combined cycle system of claim 7, wherein the carbon dioxide recycle compressor directs a second portion of the compressed carbon dioxide to an air separation unit of the syngas system.

10. The integrated gasification combined cycle system of claim 7, wherein the second gas engine comprises a gas turbine engine.

11. The integrated gasification combined cycle system of claim 7, wherein the second gas engine comprises a reciprocating gas engine.

12. The integrated gasification combined cycle system of claim 7, wherein the second gas engine comprises a turbine compressor, a combustor, a turbine, and a shaft, and wherein the carbon dioxide recycle compressor is driven by the shaft.

13. The integrated gasification combined cycle system of claim 7, wherein the syngas system further comprises an air separation unit in communication with the gasifier and the gas turbine engine, and wherein the air separation unit receives an extraction air from the gas turbine engine and directs the extraction air to the gasifier.

14. An integrated gasification combined cycle system, comprising:
  a first gas turbine engine;
  a gasifier for producing a raw syngas;
  an acid gas removal system in communication with the gasifier and the first gas turbine engine, wherein the acid gas removal system receives the raw syngas from the gasifier and removes at least a portion of carbon dioxide from the raw syngas so as to produce a clean syngas;
  a carbon dioxide recycle compressor in communication with the acid gas removal system and the gasifier, wherein the carbon dioxide recycle compressor receives the removed carbon dioxide from the acid gas removal system; and
  a second gas turbine engine in communication with the carbon dioxide recycle compressor; wherein the second gas turbine engine receives a fuel comprising a portion of the clean syngas and drives the carbon dioxide recycle compressor via combustion of the fuel.

* * * * *